US011381710B2

(12) United States Patent
Rakshit et al.

(10) Patent No.: US 11,381,710 B2
(45) Date of Patent: Jul. 5, 2022

(54) CONTEXTUAL MASKING OF OBJECTS IN SOCIAL PHOTOGRAPHS

(71) Applicant: INTERNATIONAL BUSINESS MACHINES CORPORATION, Armonk, NY (US)

(72) Inventors: Sarbajit K. Rakshit, Kolkata (IN); James E. Bostick, Cedar Park, TX (US); John M. Ganci, Jr., Raleigh, NC (US); Martin G. Keen, Cary, NC (US); Craig M. Trim, Ventura, CA (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 16/570,370

(22) Filed: Sep. 13, 2019

(65) Prior Publication Data

US 2021/0084194 A1 Mar. 18, 2021

(51) Int. Cl.
| | |
|---|---|
| *H04N 1/44* | (2006.01) |
| *G06F 21/62* | (2013.01) |
| *G06V 40/16* | (2022.01) |
| *G06T 5/50* | (2006.01) |
| *G06T 5/00* | (2006.01) |

(52) U.S. Cl.
CPC ....... *H04N 1/4493* (2013.01); *G06F 21/6254* (2013.01); *G06F 21/6263* (2013.01); *G06T 5/002* (2013.01); *G06T 5/50* (2013.01); *G06V 40/164* (2022.01); *G06V 40/166* (2022.01)

(58) Field of Classification Search
CPC ............. H04N 1/4493; G06K 9/00255; G06K 9/00241; G06F 21/6263; G06F 21/6254; G06T 5/002; G06T 5/50
See application file for complete search history.

(56) References Cited

U.S. PATENT DOCUMENTS

| | | | |
|---|---|---|---|
| 6,925,210 B2 | 8/2005 | Herf | |
| 8,407,093 B2 | 3/2013 | Cartmell | |
| 9,210,313 B1 | 12/2015 | Svendsen | |
| 9,369,454 B2 | 6/2016 | Porzio et al. | |
| 9,396,354 B1* | 7/2016 | Murphy | ................. H04L 51/12 |
| 9,451,122 B2* | 9/2016 | De Rosa | ............ H04N 1/32133 |
| 10,069,878 B1 | 9/2018 | Bastide et al. | |
| 10,430,986 B2* | 10/2019 | Frieder | .................. G06V 20/35 |
| 2006/0179022 A1* | 8/2006 | Holland | ................. G06N 3/004 |
| | | | 706/45 |
| 2007/0081744 A1 | 4/2007 | Gokturk et al. | |
| 2007/0165964 A1 | 7/2007 | Wolf | |

(Continued)

OTHER PUBLICATIONS

NPL Search History from Dialog (Year: 2021).*

(Continued)

*Primary Examiner* — Nancy Bitar
(74) *Attorney, Agent, or Firm* — Robert D. Bean

(57) ABSTRACT

According to at least one embodiment, a method, computer system, and computer program product for contextually masking visual elements in a photograph is provided. The present invention may include receiving privacy preferences from one or more users, identifying individuals in a photograph, constructing a ruleset based on the privacy preferences of the identified individuals within the photograph and, based on the ruleset, masking one or more visual elements within the photograph from view of a viewer.

17 Claims, 5 Drawing Sheets

(56) References Cited

U.S. PATENT DOCUMENTS

| | | | |
|---|---|---|---|
| 2009/0060343 | A1 | 3/2009 | Rosea |
| 2010/0198941 | A1* | 8/2010 | Rhoads .............. H04N 21/8358 709/217 |
| 2011/0258556 | A1* | 10/2011 | Kiciman ................ G06Q 10/10 715/751 |
| 2012/0007942 | A1 | 1/2012 | Michrowski et al. |
| 2012/0154557 | A1 | 6/2012 | Perez et al. |
| 2012/0250951 | A1 | 10/2012 | Chen |
| 2013/0156331 | A1 | 6/2013 | Kurabayashi et al. |
| 2013/0290716 | A1 | 10/2013 | Gavrilov |
| 2013/0329030 | A1 | 12/2013 | Tolkowsky |
| 2014/0078172 | A1 | 3/2014 | Systrom et al. |
| 2014/0370479 | A1 | 12/2014 | Gazzaley |
| 2015/0145992 | A1* | 5/2015 | Traff ...................... H04N 7/183 348/143 |
| 2015/0187136 | A1 | 7/2015 | Grimaud |
| 2016/0150036 | A1* | 5/2016 | De Rosa .............. H04W 4/185 709/206 |
| 2017/0249674 | A1* | 8/2017 | Kerger ................... G06Q 50/01 |
| 2018/0068411 | A1* | 3/2018 | Crutchfield ........... G06T 1/0021 |
| 2018/0182142 | A1 | 6/2018 | Lim |
| 2019/0026854 | A1* | 1/2019 | Crutchfield ........... G06T 1/0021 |
| 2019/0058684 | A1 | 2/2019 | Morrison et al. |
| 2019/0371065 | A1 | 12/2019 | Anders |
| 2020/0198645 | A1 | 6/2020 | Boer |

OTHER PUBLICATIONS

Mell et al., "The NIST Definition of Cloud Computing", Recommendations of the National Institute of Standards and Technology, NIST Special Publication 800-145, Sep. 2011, 7 pages.

Bardi, "9 things to know when building for ARKit or ARCore", MARXENT®, Sep. 20, 2017, 8 pages.

MARXENT®, "Diminished Reality 3D Furniture Cloud™", published on Sep. 22, 2017, YouTube, 2 pages.

Microsoft, "AI Lab", printed on Jul. 31, 2019, 4 pages, https://www.microsoft.com/en-us/ai/ai-lab.

Mori et al., "A survey of diminished reality: Techniques for visually concealing, eliminating, and seeing through real objects", IPSJ Transactions on Computer Vision and Applications. vol. 9, No. 17, (2017), pp. 1-14.

Perez, "Microsoft's new drawing bot is an AI artist", TechCrunch, Jan. 18, 2018, 5 pages, https://techcrunch.com/2018/01/18/microsofts-new-drawing-bot-is-an-a-i-artist/.

Vincent, "These faces show how far AI image generation has advanced in just four years", The Verge, Tech, Artificial Intelligence, Dec. 17, 2018, 5 pages.

https://thispersondoesnotexist.com/, Imagined by a GAN (generative adversarial network), StyleGAN (Dec. 2018)—Karras et al. and Nvidia Original GAN (2014)—Goodfellow et al., 1 page.

Andersen, et al., "Augmented Reality Concentration Cubicle," IP.com, Feb. 9, 2017, IP.com No. IPCOM000249206D, Retrieved from the Internet: <URL: https://priorart.ip.com/IPCOM/000249206>.

Disclosed Anonymous, "A Method to Detect & Prevent Distractions to a User Using Augmented Reality," IP.com, Sep. 6, 2016, 6 pages, IP.com No. IPCOM000247421D, Retrieved from the Internet: <URL: https://priorart.ip.com/IPCOM/000247421>.

H. Lee et al., "Partitioning open-plan workspaces via augmented reality." Personal and Ubiquitous Computing [article], 2019, 16 pages, DOI: 10.1007/s00779-019-01306-0, Retrieved from the Internet: <URL: https://link.springer.com/article/10.1007/s00779-019-01306-0>.

Li, et al., "Predicting Perceived Visual and Cognitive Distractions of Drivers with Multimodal Features," IEEE Transactions on Intelligent Transportation Systems, Jun. 17, 2014, pp. 51-65, vol. 16, Issue 1 (Feb. 2015), IEEE, DOI: 10.1109/TITS.2014.2324414, Retrieved from the Internet: <URL: https://ieeexplore.ieee.org/document/6837482>.

* cited by examiner

CONTEXTUAL MASKING OF OBJECTS IN SOCIAL PHOTOGRAPHS

BACKGROUND

The present invention relates, generally, to the field of computing, and more particularly to digital privacy.

Digital privacy is the field concerned with managing access to digital data of a user such that the user's data is only accessible to those whom the user grants access, and the data is inaccessible to unauthorized individuals. In a world where unauthorized access to digital information can have devastating real-world consequences, digital privacy is of crucial importance. However, preserving privacy has become a messy process in the current era of social media, blogging, sharing, et cetera; while uploading personal information such as photographs, status updates, videos, and more may be necessary for maintaining a vibrant online presence, it introduces a danger of allowing unauthorized users access to the digital lives of users.

SUMMARY

According to an embodiment, a method, computer system, and computer program product for contextually masking visual elements in a photograph is provided. The present invention may include receiving privacy preferences from one or more users, identifying individuals in a photograph, constructing a ruleset based on the privacy preferences of the identified individuals within the photograph and, based on the ruleset, masking one or more visual elements within the photograph from view of a viewer.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
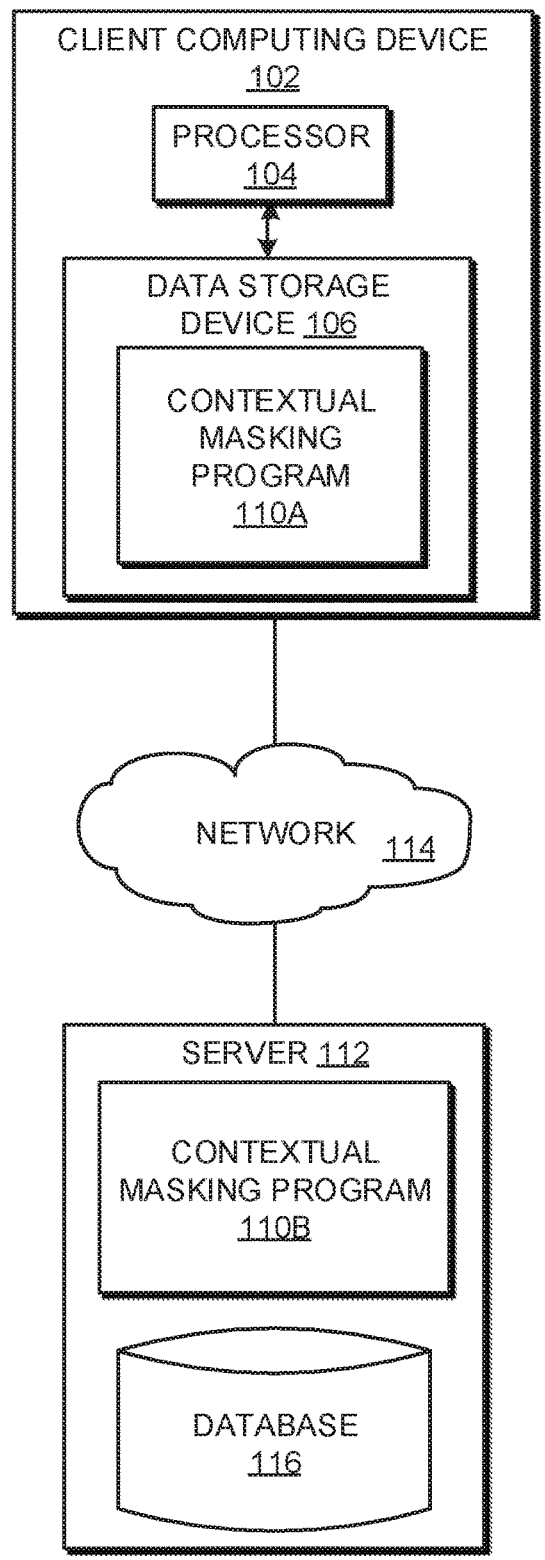
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to digital privacy. The following described exemplary embodiments provide a system, method, and program product to, among other things, alter photographs as they appear on a social site and as brought up for a specific viewer, to mask or hide individuals or elements that were systematically determined to remain unseen to the specific viewer. Therefore, the present embodiment has the capacity to improve the technical field of digital privacy by allowing individual photographs, and even video, to comply with all users' privacy preferences without blocking authorized content.

As previously described, digital privacy is the field concerned with managing access to digital data of a user such that the user's data is only accessible to those whom the user grants access, and the data is inaccessible to unauthorized individuals. In a world where unauthorized access to digital information can have devastating real-world consequences, digital privacy is of crucial importance. However, preserving privacy has become a messy process in the current era of social media, blogging, sharing, et cetera; while uploading personal information such as photographs, status updates, videos, and more may be necessary for maintaining a vibrant online presence, it introduces a danger of allowing unauthorized users access to the digital lives of users.

Users share countless photographs every day on social networking platforms. A cornerstone of social networking lies in sharing photographs and other personal information with a community of friends or acquainted; such dissemination of photographs can become a problem when the shared photographs are misused, and personal information from the photograph falls into the wrong hands. Various digital privacy solutions have been implemented, namely permissions-based rules that restrict information access to a specified group. However, these methods lack granularity, and in the case of photographs can fail, allowing unauthorized users access to the photograph. For instance, if there are multiple users tagged in a photograph, oftentimes the platform will make that photograph available to the friends of all tagged users, which means that a tagged user may find that the photograph has a large audience of complete strangers. Even if a user un-tags herself, the user is still in the photograph and can be seen by friends of tagged users. As such, it may be advantageous to, among other things, implement a system that utilizes facial recognition to identify individuals in a photograph, assesses the privacy permissions of each individual, and utilize digital image processing technologies to mask individual visual elements of the photograph from view of unauthorized users, while leaving authorized elements or individuals.

According to an embodiment, the invention may be a method of altering digital photographs in real-time as they appear on a social site and as presented to a specific viewer based on relationships, configuration, facial analysis, and other techniques, to mask or hide visual elements that were systematically determined to remain unseen to the specific viewer. A visual element may be any visual component of a digital photograph, such as an object, location, or individual, that an individual may want to mask from the view of an unauthorized user.

In some embodiments of the invention, a use case may proceed as follows: Jim posts a picture and his friends can see his picture of him on a ski trip in Vail, Colo. At the same time, Jim doesn't want strangers seeing that he is away from home. Jim has configured so that his friends and family can view his pictures (this can be done as a global property and can be applied to specific pictures too). Jim's friends Sarah, Aditya and Leslie can see the picture of Jim in vail. Johnny Stranger doesn't have a documented relationship with Jim on the social site, and because of Jim's personal settings, the picture uploaded to Johnny's social feed will not include Jim. It may be the full view of the picture along with other people in the photograph. However, Jim's picture will have disappeared with diminished reality or in a simpler embodiment, Jim's picture will be blurred. Along with that, any tagging of Jim in the picture or mention of him in comments will also be removed or replaced. This altered photograph happens in real time as the photo is rendered on the social site. Additionally, if the photo is copied or downloaded, the picture will be similarly masked.

An embodiment of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to alter photographs as they appear on a social site and as brought up for a specific viewer, to mask or hide individuals or elements that were systematically determined to remain unseen to the specific viewer.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a contextual masking program 110A and communicate with the server 112 via the communication network 114, in accordance with an embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a contextual masking program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the contextual masking program 110A, 110B may be a program capable of alter photographs as they appear on a social site and as brought up for a specific viewer, to mask or hide individuals or elements that were systematically determined to remain unseen to the specific viewer. The contextual masking program 110A, 110B may be located on client computing device 102 or server 112 or on any other device located within network 114. Furthermore, contextual masking program 110A, 110B may be distributed in its operation over multiple devices, such as client computing device 102 and server 112. The contextual masking method is explained in further detail below with respect to FIG. 2.

Figure 2:
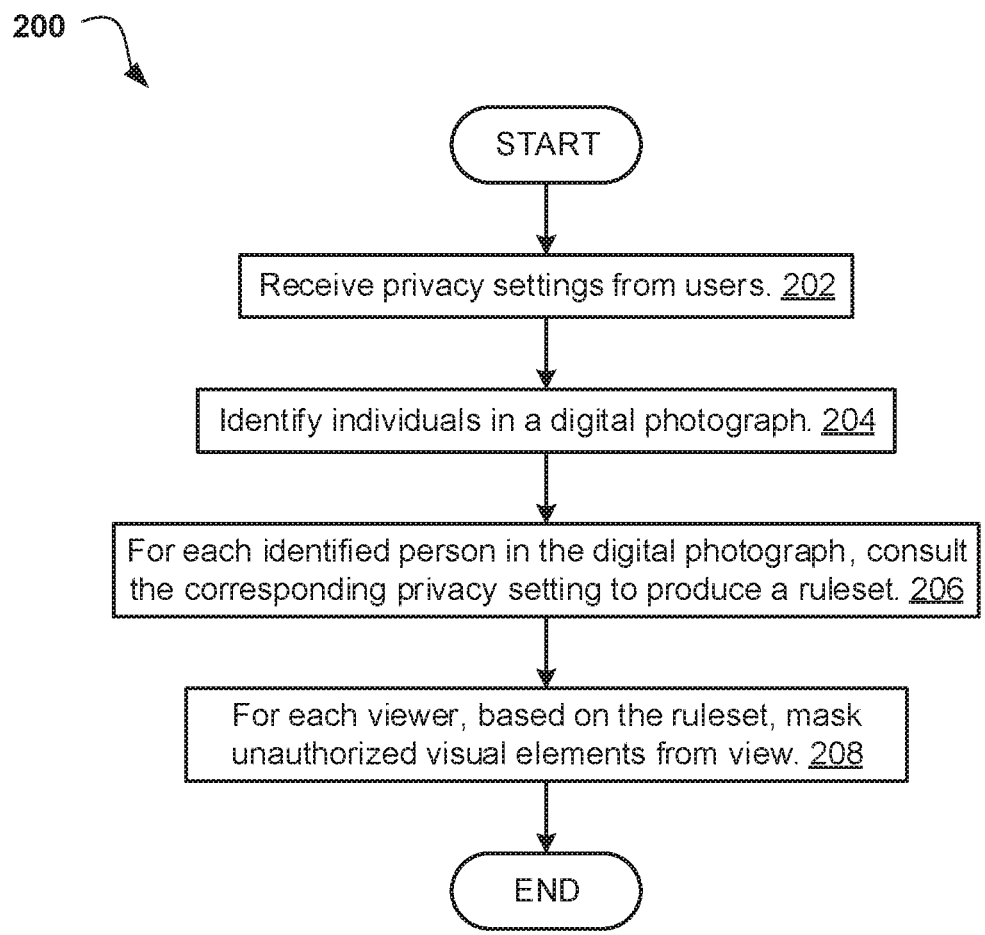
FIG. 2 is an operational flowchart illustrating a contextual masking process according to at least one embodiment.

Referring now to FIG. 2, an operational flowchart illustrating a contextual masking process 200 is depicted according to at least one embodiment. At 202, the contextual masking program 110A, 110B may receive privacy settings from users. The contextual masking program 110A, 110B may receive privacy settings in response to a prompt, and or may receive the privacy settings electronically over network 114. The privacy settings may be a combination of different settings including preferences for who can view images containing the user (for example friends, family, friends of friends, people in social groups, anonymous strangers, et cetera), who can download images containing the user, who can view the location of images containing the user. Furthermore, users may choose different privacy settings for vacation images as opposed to local images; local images may be photographs or video taken close to the user's home, for example at the gym, a restaurant, et cetera. Vacation images on the other hand may be photographs or video taken far away from the user's home. The user may, for instance, prefer that local photographs be accessible to a smaller group of people to prevent unauthorized users from inferring the location of the user's home. Alternately, the user may prefer that vacation images be available to a smaller group of people in case other friends feel left out. In some embodiments of the invention, contextual masking program 110A, 110B may instead or additionally receive user settings or preferences pertaining to individual objects or classes of objects that a user might wish to mask from view. For instance, a user might want to mask his affiliation with a company by hiding all instances of a company logo in a photo, or may want to conceal a specific painting, or a new car, et cetera. In some embodiments, contextual masking program 110A, 110B may solicit privacy settings from users, such as by a text prompt.

At 204, the contextual masking program 110A, 110B may identify individuals in a digital photograph. The contextual masking program 110A, 110B may identify individuals within a photograph in real time or in near real time by searching tags of the photograph, names mentioned in text associated with the photograph or in comments associated with the text. The contextual masking program 110A, 110B may also prompt a user to identify users in a photograph, such as by tagging the photograph or individuals within the photograph. In some embodiments the contextual masking program 110A, 110B may store or collect these photographs containing identified individuals, which may be drawn from to assist the accuracy of a facial analysis functionality of contextual masking program 110A, 110B. The contextual masking program 110A, 110B may augment the collection of photographs containing identified individuals with new such photographs uploaded by a user to further improve accuracy. In some embodiments, contextual masking program 110A, 110B may associate multiple categories of pictures with a user, for instance dividing photos according to age ranges of the user. The contextual masking program 110A, 110B may use facial analysis technology to detect individual faces within the photograph, such as by using machine learning techniques including genetic algorithms or eigenfaces. The contextual masking program 110A, 110B may then analyze the detected faces to detect matches against stored faces that have been previously identified, such as in previously uploaded photographs with identified users. In some embodiments of the invention, contextual masking program 110A, 110B may instead or additionally use techniques such as object-class detection to identify individual objects or classes of objects within the photograph, and/or may prompt a user to identify objects in a photograph to be masked. In some embodiments of the invention, contextual masking program 110A, 110B may solicit feedback from users to verify that correct identification of all individuals and/or objects has been achieved, and may update photographs with newly identified individuals or objects based on the feedback. In some embodiments, for example in embodiments where contextual masking program 110A, 110B detects an individual or a face, such as by using facial detection methods, but cannot identify the individual, contextual masking program 110A, 110B may mask the individual from view as described further in step 208.

At 206, the contextual masking program 110A, 110B may, for each identified person in the digital photograph, consult the corresponding privacy setting to produce a ruleset. Here, contextual masking program 110A, 110B may make a list of each individual identified in a photograph. For each identified individual, the contextual masking program 110A, 110B may retrieve user preferences to assess who that user will allow to view their photographs; depending on the settings, authorized users may include friends, family, friends of friends, select social groups, et cetera. The contextual masking program 110A, 110B may combine all of these settings into a ruleset which governs who may view each given individual identified in the photograph.

At 208, the contextual masking program 110A, 110B may, for each viewer, based on the ruleset, mask unauthorized visual elements from view. For each viewer, which is to say each individual digitally accessing or viewing the photograph as identified, for example, by the social media platform, contextual masking program 110A, 110B may consult the ruleset to determine which identified individuals, objects, and/or locations within the photograph the viewer is authorized to view. In some embodiments, if a viewer is not allowed to see any individuals, or some threshold number or percentage of visual elements within a photograph, the viewer may not be allowed to access the photograph at all, depending on a configuration setting of the viewer or based on the preference of an individual within the ruleset.

The contextual masking program 110A, 110B may use a variety of different techniques to mask an individual. The face and/or body of each individual that the viewer is not authorized to see may be blurred out, or may be replaced with an image or shape. The image may be a face of a person that does not exist, constructed using facial image generation, and fitted over the face of the identified individual in the photograph. The contextual masking program 110A, 110B may utilize diminished reality techniques to mask the individual, for instance by replacing the region occupied by the individual with a background constructed through a variety of possible methods, such as by overlaying a background taken or extrapolated from a photograph of the same location where the background was visible, or by painting a background over the individual using texture and patch information from the photograph itself. Additionally, contextual masking program 110A, 110B may make further adjustments such as untagging masked individuals, masking or removing the names of masked individuals in text associated with the photograph, and configuring the platform or service hosting the photograph such that the modified photograph made available to the viewer, with unauthorized individuals or elements removed, is the version that the viewer has the option to save or download if such option is available. In some embodiments, contextual masking program 110A, 110B may remove location information from the photograph, and may remove references to objects or locations from text associated with the photograph. Text associated with the photograph may include tags, comments, summaries, et cetera. In some embodiments, objects may be removed using diminished reality or blurring, or may be replaced with images drawn by contextual masking program 110A, 110B.

It may be appreciated that FIG. 2 provides only an illustration of one implementation and does not imply any limitations with regard to how different embodiments may be implemented. Many modifications to the depicted environments may be made based on design and implementation requirements. For example, embodiments of this invention may be applied to videos. In some embodiments, the invention may be applied to videos in real time, such as videos taken using alternate reality or virtual reality headsets, or streamed live. In such embodiments, a slight delay may be introduced between receiving the video and when it is presented to a viewer to allow time for processing of the images within the video.

Figure 3:
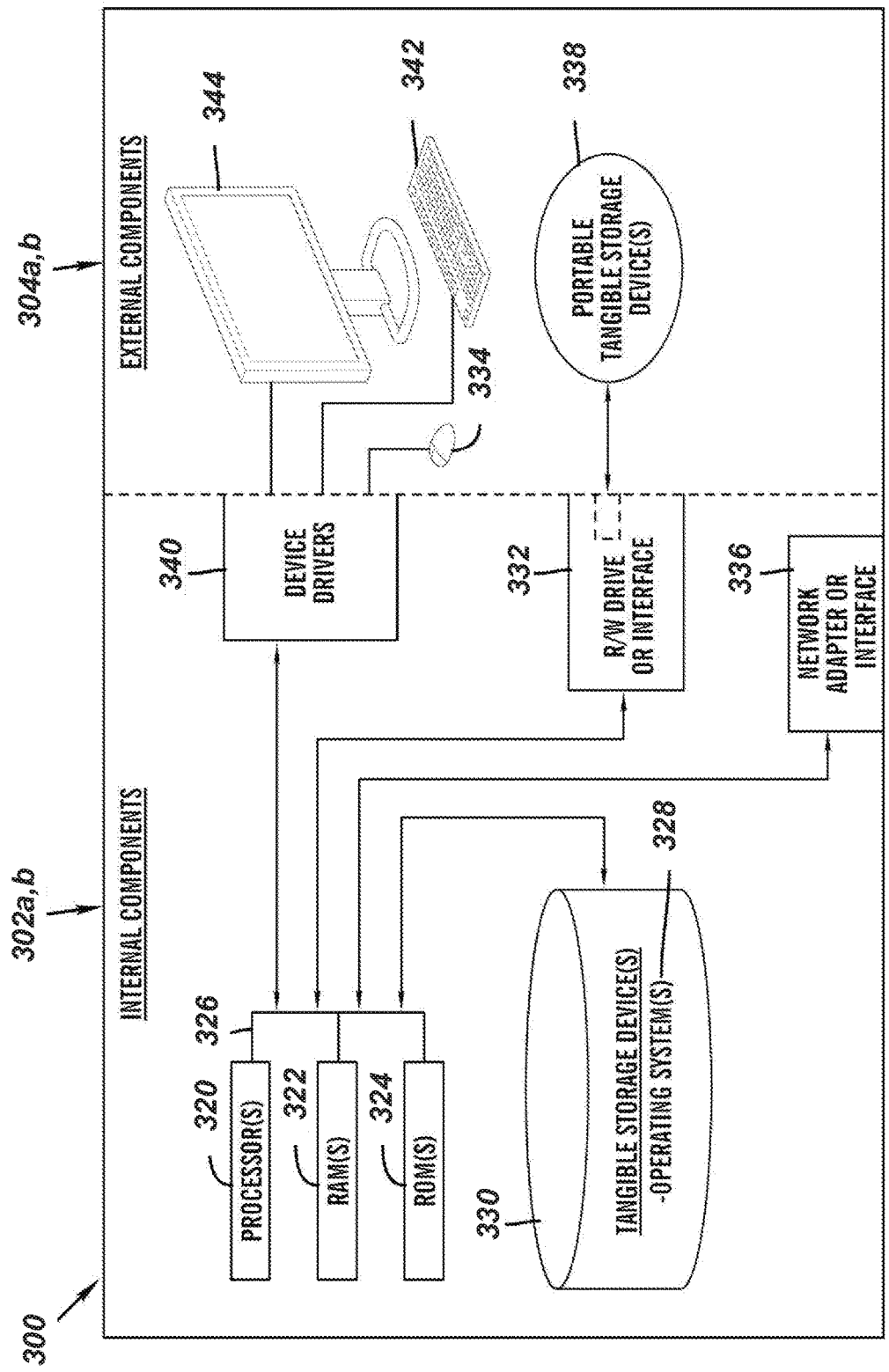
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the contextual masking program 110A in the client computing device 102, and the contextual masking program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 *a,b* also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the contextual masking program 110A, 110B, can be stored on one or more of the respective portable computer-readable tangible storage devices 338, read via the respective R/W drive or interface 332, and loaded into the respective hard drive 330.

Each set of internal components 302 *a,b* also includes network adapters or interfaces 336 such as a TCP/IP adapter cards, wireless Wi-Fi interface cards, or 3G or 4G wireless interface cards or other wired or wireless communication links. The contextual masking program 110A in the client computing device 102 and the contextual masking program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the contextual masking program 110A in the client computing device 102 and the contextual masking program 110B in the server 112 are loaded into the respective hard drive 330. The network may comprise copper wires, optical fibers, wireless transmission, routers, firewalls, switches, gateway computers and/or edge servers.

Each of the sets of external components 304 *a,b* can include a computer display monitor 344, a keyboard 342, and a computer mouse 334. External components 304 *a,b* can also include touch screens, virtual keyboards, touch pads, pointing devices, and other human interface devices. Each of the sets of internal components 302 *a,b* also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
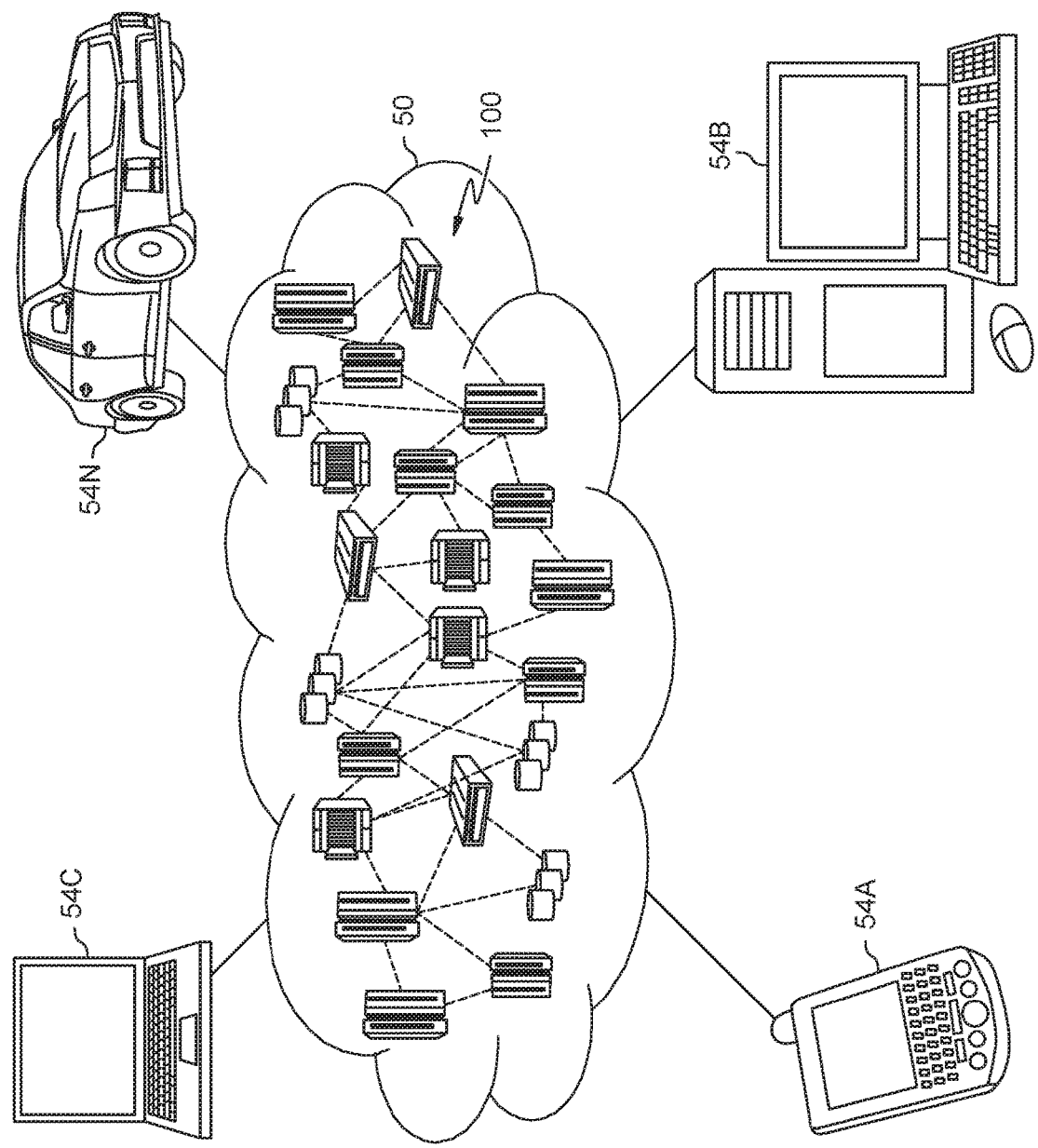
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
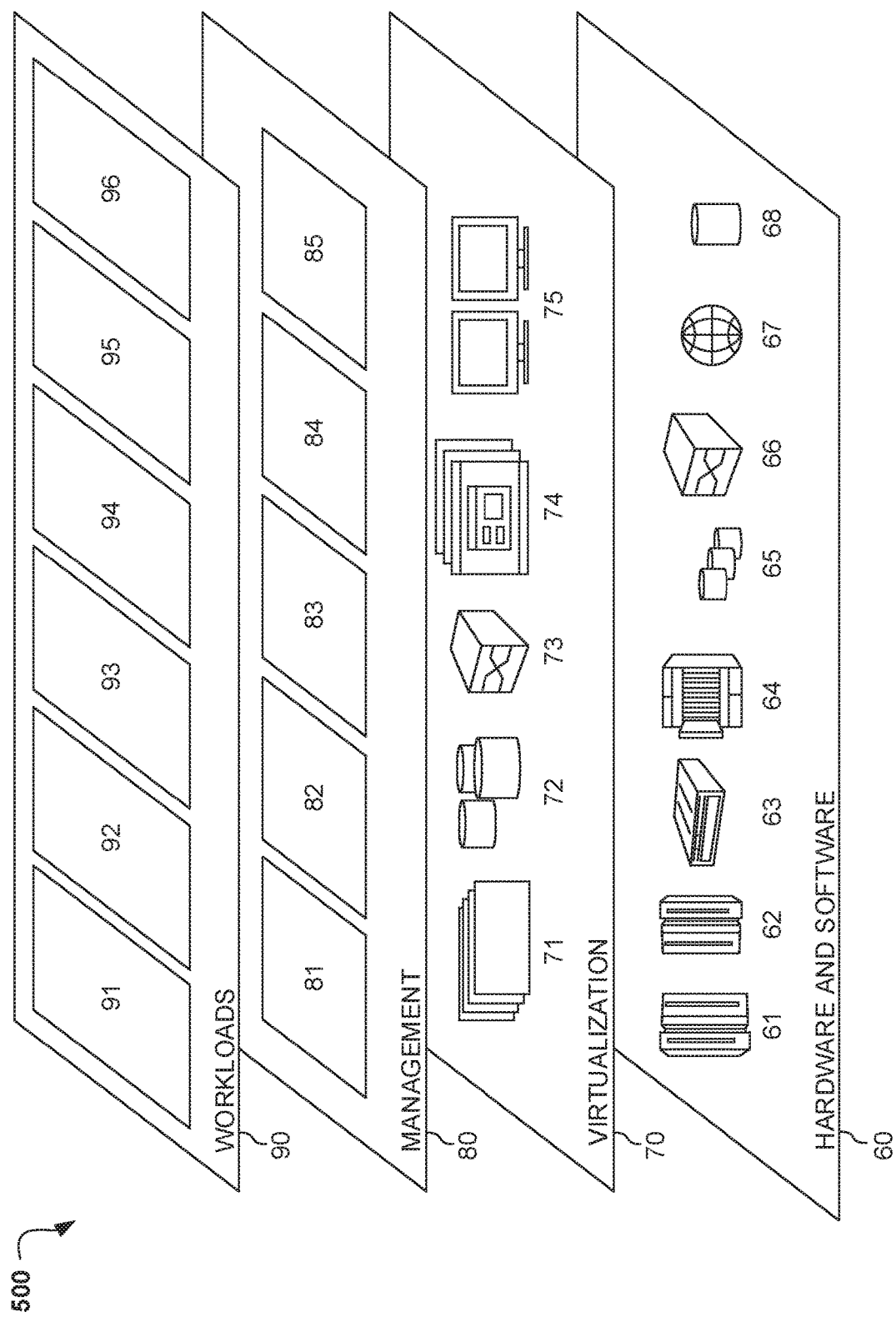
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual masking 96. Contextual masking 96 may relate to altering photographs as they appear on a social site and as brought up for a specific viewer, to mask or hide individuals or elements that were systematically determined to remain unseen to the specific viewer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for contextually masking visual elements in a digital photograph, the method comprising:
   constructing, by a processor, a ruleset based on one or more privacy preferences of a plurality of identified individuals within the digital photograph;
   responsive to a viewer digitally accessing the digital photograph and prior to displaying the digital photograph to the viewer, masking, by the processor, one or more visual elements within the digital photograph from view of the viewer based on the ruleset and an identity of the viewer;
   responsive to a viewer digitally accessing the digital photograph and prior to displaying the digital photograph to the viewer, removing, by the processor, one or more textual references to the one or more visual elements from a plurality of social media comments associated with the digital photograph; and
   displaying the masked digital photograph to the viewer.

2. The method of claim 1, wherein the visual elements may be one or more elements selected from a list consisting of:
   faces, individuals, objects, and locations.

3. The method of claim 1, further comprising; untagging one or more identified individuals from the digital photograph.

4. The method of claim 1, wherein the identified individuals are identified using one or more facial detection techniques.

5. The method of claim 1, wherein the one or more visual elements are masked using one or more techniques selected from a list consisting of:
   diminished reality, blurring, and image replacement.

6. The method of claim 1, wherein the identified individuals are identified from a plurality of text associated with the digital photograph.

7. A computer system for contextually masking visual elements in a digital photograph, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

constructing a ruleset based on one or more privacy preferences of a plurality of identified individuals within the digital photograph;

responsive to a viewer digitally accessing the digital photograph and prior to displaying the digital photograph to the viewer, masking one or more visual elements within the digital photograph from view of the viewer based on the ruleset and an identity of the viewer;

responsive to a viewer digitally accessing the digital photograph and prior to displaying the digital photograph to the viewer, removing one or more textual references to the one or more visual elements from a plurality of social media comments associated with the digital photograph; and displaying the masked digital photograph to the viewer.

8. The computer system of claim 7, wherein the visual elements may be one or more elements selected from a list consisting of:

faces, individuals, objects, and locations.

9. The computer system of claim 7, further comprising; untagging one or more identified individuals from the digital photograph.

10. The computer system of claim 7, wherein the identified individuals are identified using one or more facial detection techniques.

11. The computer system of claim 7, wherein the one or more visual elements are masked using one or more techniques selected from a list consisting of:

diminished reality, blurring, and image replacement.

12. The computer system of claim 7, wherein the identified individuals are identified from a plurality of text associated with the digital photograph.

13. A computer program product for contextually masking visual elements in a digital photograph, the computer program product comprising:

one or more computer-readable tangible storage medium and program instructions stored on at least one of the one or more tangible storage medium, the program instructions executable by a processor to cause the processor to perform a method comprising:

constructing a ruleset based on one or more privacy preferences of a plurality of identified individuals within the digital photograph;

responsive to a viewer digitally accessing the digital photograph and prior to displaying the digital photograph to the viewer, masking one or more visual elements within the digital photograph from view of the viewer based on the ruleset and an identity of the viewer;

responsive to a viewer digitally accessing the digital photograph and prior to displaying the digital photograph to the viewer, removing one or more textual references to the one or more visual elements from a plurality of social media comments associated with the digital photograph; and displaying the masked digital photograph to the viewer.

14. The computer program product of claim 13, wherein the visual elements may be one or more elements selected from a list consisting of:

faces, individuals, objects, and locations.

15. The computer program product of claim 13, further comprising; untagging one or more identified individuals from the digital photograph.

16. The computer program product of claim 13, wherein the identified individuals are identified using one or more facial detection techniques.

17. The computer program product of claim 13, wherein the one or more visual elements are masked using one or more techniques selected from a list consisting of:

diminished reality, blurring, and image replacement.

* * * * *